(12) United States Patent
Williams

(10) Patent No.: US 9,351,449 B2
(45) Date of Patent: May 31, 2016

(54) PLANT PROTECTION SYSTEM

(71) Applicant: Kevin M. Williams, Tiffin, OH (US)

(72) Inventor: Kevin M. Williams, Tiffin, OH (US)

(*) Notice: Subject to any disclaimer, the term of this patent is extended or adjusted under 35 U.S.C. 154(b) by 165 days.

(21) Appl. No.: 14/211,021

(22) Filed: Mar. 14, 2014

(65) Prior Publication Data

US 2014/0259901 A1  Sep. 18, 2014

Related U.S. Application Data

(60) Provisional application No. 61/782,032, filed on Mar. 14, 2013.

(51) Int. Cl.
*A01G 13/10*  (2006.01)
*A01G 13/00*  (2006.01)

(52) U.S. Cl.
CPC ............ *A01G 13/10* (2013.01); *A01G 13/0243* (2013.01); *Y10T 29/49885* (2015.01)

(58) Field of Classification Search
CPC ... A01G 13/00; A01G 13/02; A01G 13/0243; A01G 13/10
USPC ...................................... 47/30, 31
See application file for complete search history.

(56) References Cited

U.S. PATENT DOCUMENTS

| | | | | | |
|---|---|---|---|---|---|
| 951,807 | A * | 3/1910 | Erdly | ..................... | A01G 13/04 47/29.5 |
| 1,552,445 | A * | 9/1925 | Peres | ................... | A01G 13/043 47/31 |
| 2,009,867 | A * | 7/1935 | Ball | ......................... | A01G 9/12 135/121 |
| 2,753,662 | A * | 7/1956 | Behnke | ................. | A01G 13/04 47/29.2 |
| 2,996,842 | A * | 8/1961 | Weston | ................. | A01G 13/10 47/30 |
| 4,858,380 | A * | 8/1989 | Gayle | .................... | A01G 17/06 47/31 |
| 4,965,070 | A * | 10/1990 | Messina | ................. | A01N 65/00 424/405 |
| 5,222,325 | A * | 6/1993 | Angus | ............... | A01G 13/0225 135/100 |
| 5,930,948 | A * | 8/1999 | Daniel | ................... | A01G 13/10 135/158 |
| 6,233,868 | B1 * | 5/2001 | Hahn | ..................... | A01G 13/10 47/30 |
| 2006/0024343 | A1 * | 2/2006 | Wilkins | ................. | A01N 25/00 424/405 |
| 2006/0150478 | A1 * | 7/2006 | Gfesser | ............. | A01G 13/0243 47/32.4 |
| 2007/0062114 | A1 * | 3/2007 | Kruer | ....................... | A01G 9/02 47/65.8 |
| 2010/0218421 | A1 * | 9/2010 | Monnes | ................. | A01G 13/10 47/29.5 |
| 2011/0219682 | A1 * | 9/2011 | Butler | ............... | A01G 13/0243 47/31 |
| 2012/0227316 | A1 * | 9/2012 | Ptak | ........................ | A01G 9/02 47/32.3 |

* cited by examiner

*Primary Examiner* — Monica Williams
(74) *Attorney, Agent, or Firm* — Fraser Clemens Martin & Miller LLC; Jacob M. Ward

(57) ABSTRACT

A system and method for deterring animal interaction with woody plants is provided, including a wire mesh cage. The wire mesh cage is formed from one of a sheet of steel wire mesh and a stake cage. The sheet of wire mesh may be formed into a tubular configuration to surround a plant in need of the protection. The stake cage may be formed from a plurality of uprights arranged around a periphery of a plant, and at least one filament wound around the plurality of uprights to form the wire mesh. The wire mesh cage may further include a protective covering, in the form of a cap or coating applied to a top surface of the wire mesh cage. The protective covering militates against damage to a plant surrounded by the wire mesh cage. The protective covering may be formed from a polymeric compound having an animal detracting additive and an ultraviolet inhibitor.

11 Claims, 3 Drawing Sheets

PLANT PROTECTION SYSTEM

CROSS-REFERENCE TO RELATED APPLICATIONS

This application claims the benefit of U.S. Provisional Application Ser. No. 61/782,032, filed Mar. 14, 2013. The entire disclosure of the above application is hereby incorporated herein by reference.

FIELD OF THE INVENTION

The present disclosure relates to systems and methods for deterring animal interaction with, and damage to, developing woody plants.

BACKGROUND OF THE INVENTION

In addition to the risk of disease and unfavorable growing conditions, young trees and shrubs are increasingly vulnerable to damage imposed by animals, particularly deer. Due to their size, young woody plants present their vegetation at a height that deer find readily accessible for browsing. This leaves the plants exposed to defoliation when deer over consume, thus restricting the plant's ability to maintain its lifecycle, and eventually killing the plant.

Beyond the concern of browsing animals, both young and matured woody plants are susceptible to significant damage caused by antlered animals, such as deer, rubbing their antlers against the plants. The rubbing causes removal of the plant's protective bark, exposing the plant and the life supporting cambium to the stress of the environment. In addition to harming the plant's growth and productivity, this bark damage also harms the plant's aesthetics, harming its overall economic value.

Chemical-based animal deterrents and plastic trunk guards are known in the art. The chemical-based deterrents work by applying a repugnant odorous or poor tasting substance on or around the targeted plant. This repugnancy deters animals from consuming the plant, thus deterring grazing, browsing, and rubbing by the animals. However, these chemical deterrents are limited in their application, because they are only temporary. The chemical-based deterrents also require regular, e.g., seasonal, or more frequent, applications to remain effective. In the event that the chemical deterrent is washed off by the elements, the plant once again becomes desirable to animals. Also, new growth (e.g., shoots and leaves) grown by the plant after chemical application are unprotected.

The plastic trunk guards offer a different approach than the chemical deterrents, but are limited to protection of segments of trunks that are straight in form, small in diameter, and free of branches. Known trunk guards are insufficient to protect vegetation of the plant from browsing wildlife. Plastic trunk guards known in the art also have certain design deficiencies, in that they are easily torn apart and removed by rutting deer.

Moreover, known tree cages can undesirably cause damage to the young plants they are intended to protect. The damage occurs particularly when the plant whips about, and comes into contact with the top ring of the tree cage during storms and other times of high wind.

There is a continuing need for a system and method of militating against animal interaction with developing woody plants, including woody plants such as trees and shrubs.

SUMMARY OF THE INVENTION

In concordance with the instant disclosure, a system and method of militating against animal interaction with developing woody plants, including woody plants such as trees and shrubs, is surprisingly discovered.

In one embodiment, a plant protection device includes a cage having a first end and a spaced apart second end. A protective covering is disposed on the second end of the cage. The protective covering is configured to militate against damage to the plant, particularly when the plant comes into contact with the protective covering.

A method of deterring animals from interacting with a plant is also disclosed. The method comprises a step of providing a cage having a first end and a second end. The cage is placed around the plant. A protective covering formed from a polymer is then applied to the second end of the cage.

In another embodiment, a protective covering for at least a portion of a cage is disclosed. The protective covering includes a cap formed from a polymer. The polymer may have an additive imparting at least one of a flavor and an odor that is undesirable to animals. Additives such as ultraviolet inhibitors or antidegradants may also be used to protect against deterioration caused by solar UV radiation. The cap may be bulbous or have a desired cross-sectional shape, and have an aperture formed in one side thereof for receiving one of a wire mesh edge and a post.

BRIEF DESCRIPTION OF THE DRAWINGS

The above, as well as other objects and advantages of the disclosure, will become readily apparent to those skilled in the art from reading the following detailed description of various embodiments of the disclosure when considered in the light of the accompanying drawings in which.

DETAILED DESCRIPTION OF THE INVENTION

The following detailed description and appended drawings describe and illustrate various exemplary embodiments of the disclosure. The description and drawings serve to enable one skilled in the art to make and use the disclosure, and are not intended to limit the scope of the disclosure in any manner. In respect of the methods disclosed, the steps presented are exemplary in nature, and thus, the order of the steps is not necessary or critical.

Figure 1:
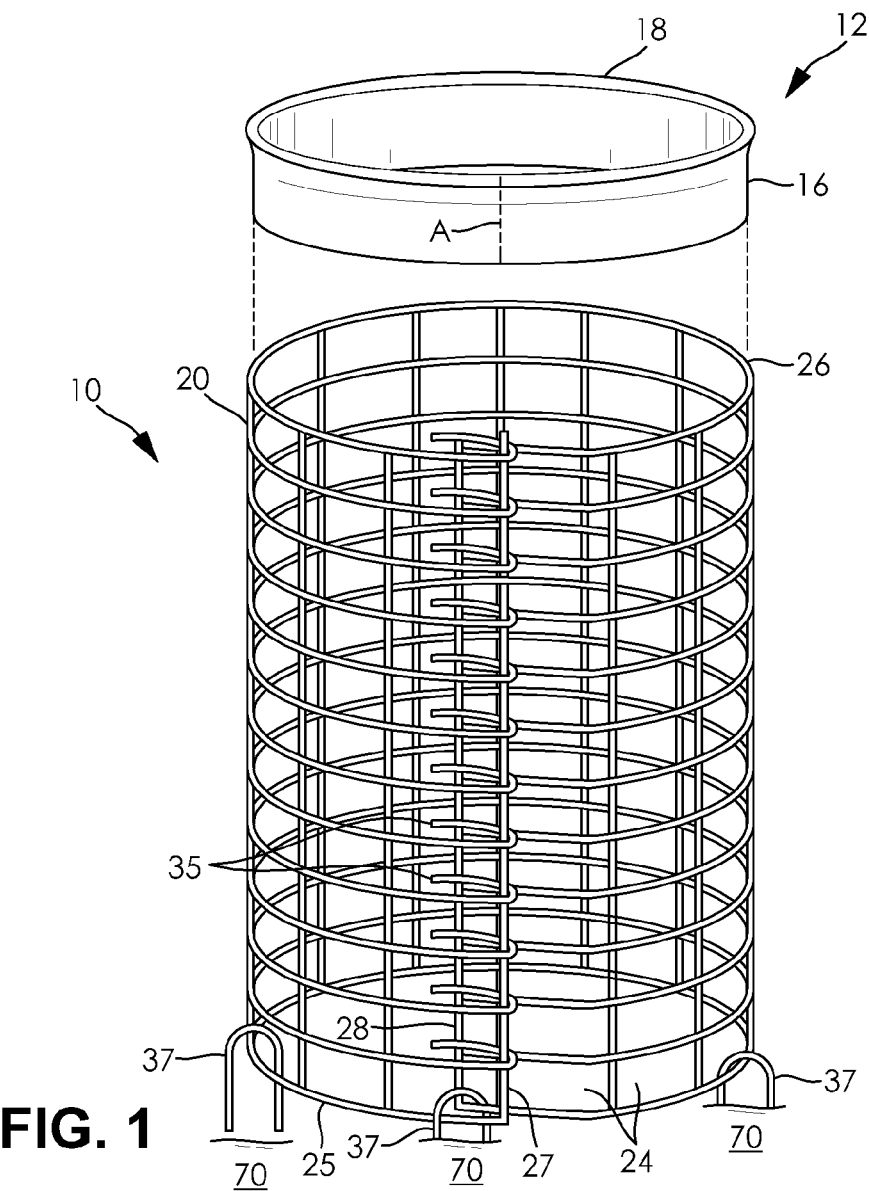
FIG. 1 is a front perspective view of a wire mesh cage according to one embodiment of the disclosure.
Figure 2:
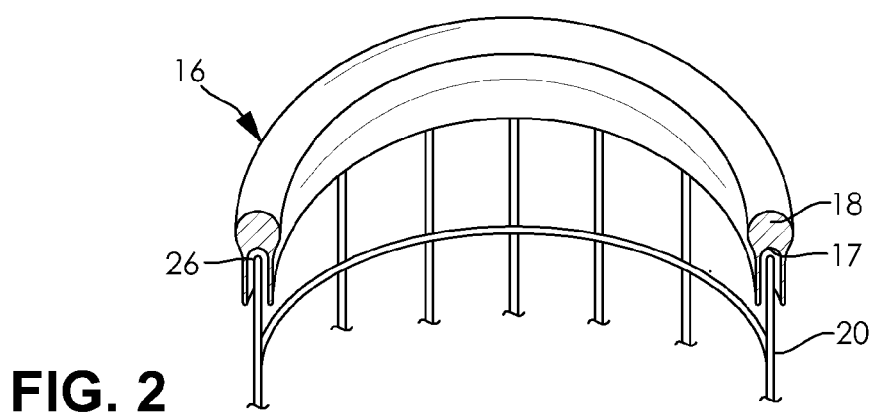
FIG. 2 is a fragmentary cross-sectional front perspective view of the wire mesh cage illustrated in FIG. 1, showing a protective cap disposed thereon.
Figure 3:
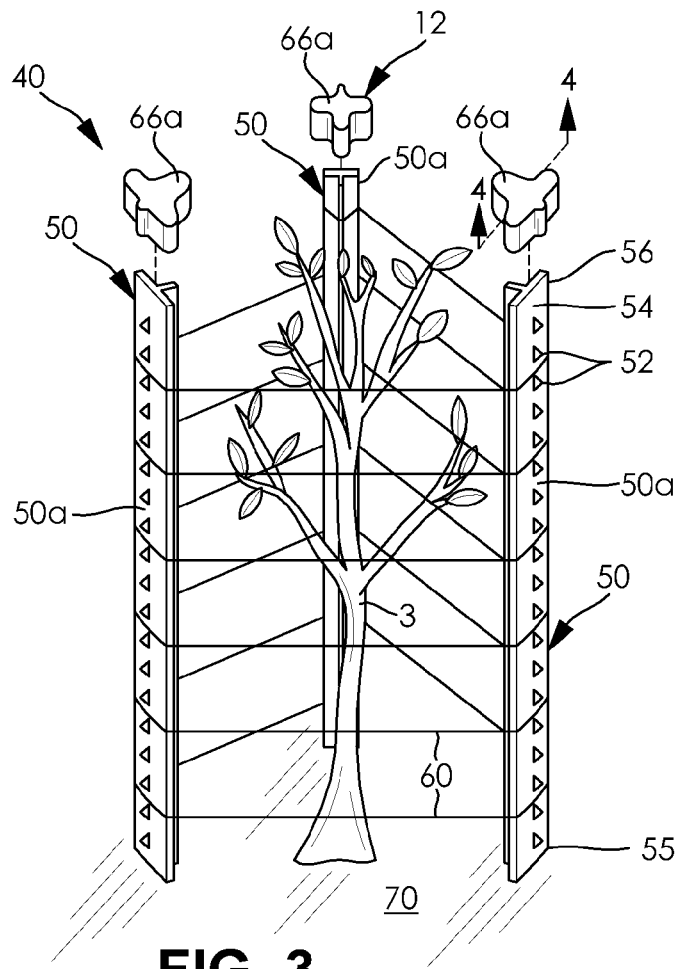
FIG. 3 is a perspective view of wire mesh cage according to another embodiment of the disclosure, the wire mesh cage formed from a wire filament wrapping a plurality of T-shaped posts having protective stake caps.
Figure 5:
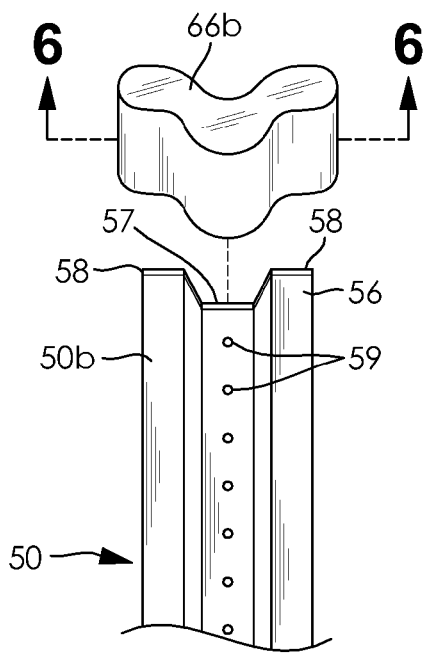
FIG. 5 is a fragmentary front perspective view of a U-shaped post and a stake cap according to a further embodiment of the disclosure.
Figure 6:
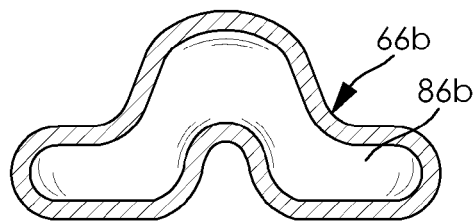
FIG. 6 is a cross-sectional bottom elevational view of the stake cap taken through line 6-6 in FIG. 5.
Figure 7:
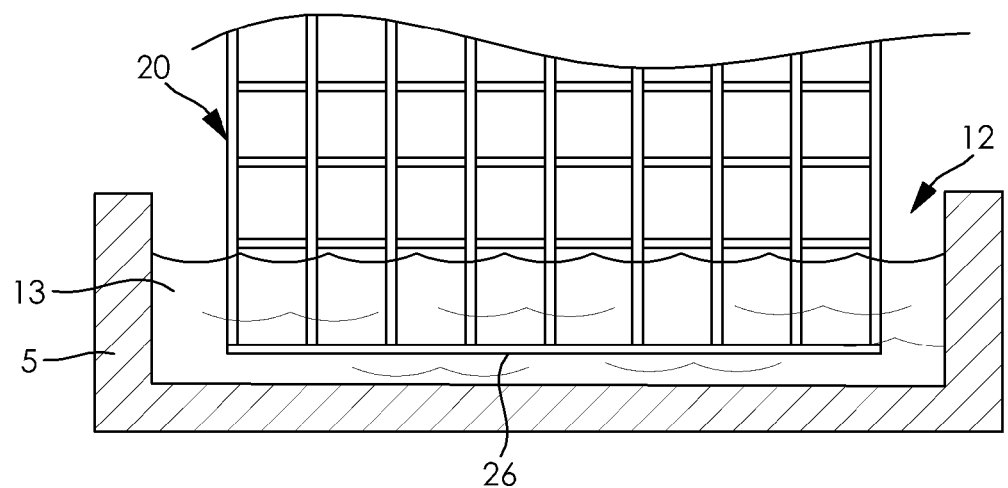
FIG. 7 is a fragmentary cross-sectional side elevational view of a wire mesh being dipped into a tray of a polymeric material to form a protective cap.

FIGS. 1-7 illustrate a system and method for protecting plants from interaction with animals that may damage the plants. As shown in FIGS. 1-2 and 7, the plant protection system may includes a wire mesh cage 10 used to surround and protect a plant from undesired interference from animals. In certain embodiments, the wire mesh cage 10 is provided in the form of a stake cage 40, for example, as shown in FIG. 3. Advantageously, the wire mesh cage 10, 40 militates against damage to portions of the plant when blown into or otherwise striking the wire mesh cage 10, 40 during a storm or a period of high winds.

As shown in FIG. 1, the wire mesh cage 10 includes a pre-formed sheet of wire mesh 20 that is formed into a shape to surround a plant in need of protection, such as a substantially cylindrical or tubular shape. It should be understood, however, that the wire mesh 20 may be formed into any shape suitable for surrounding the plant being protected, including a substantially triangular shape, a substantially rectangular shape, or a substantially octagonal shape, as nonlimiting examples.

The wire mesh 20 may be formed from any material having suitable strength to prevent an animal from penetrating the wire mesh 20 to gain access to the plant being protected, while also having a suitable degree of flexibility to allow the wire mesh 20 to be formed into a desired shape around the plant. For example, the wire mesh 20 may be formed from a steel wire mesh, where the steel wire mesh is either a welded wire mesh or a knotted wire mesh.

The wire mesh 20 may be formed from a first plurality of wires spaced apart from each other and arranged parallel to each other intertwined or coupled to a second plurality of wires spaced apart from each other and arranged perpendicular to the first plurality of wires, forming a plurality of holes 24 in the wire mesh 20. Each of the holes 24 may be rectangular in shape and may have any size suitable to prevent animals from fitting through the holes 24. The holes 24 may, for instance, be 2×4 inch rectangular holes 24 or 2×2 inch square holes 24. It should be understood, however, that the holes 24 may have any shape and size to prevent an animal from penetrating the wire mesh 20.

As a nonlimiting example, where a smaller plant having a relatively short height is being protected, the wire mesh 20 may be formed from 14 gauge welded steel, for example. As a further nonlimiting example, where a larger plant is being protected, including protecting a trunk of a tree, the wire mesh 20 may be formed from 14 or 12½ gauge steel wire, for example. Other types of materials, mesh types, and hole sizes may also be used within the scope of the present disclosure.

As shown in FIGS. 1-2, the wire mesh 20 may include a first end edge 25 arranged in parallel to a second end edge 26, and a first side edge 27 arranged in parallel to a second side edge 28. The first side edge 27 and the second side edge 28 may connect the first end edge 25 to the second end edge 26 in a direction perpendicular to each of the first end edge 25 and the second end edge 26. As shown in FIG. 1, the first end edge 25 rests on a ground surface 70. The second end edge 26 is spaced apart from the ground surface 70 when the wire mesh cage 10 is disposed in an upright position about a plant, in operation.

The first end edge 25 and the second end edge 26 may have any length needed to allow the wire mesh 20 to be wrapped around the plant or tree trunk being protected. Where the wire cage 10 is formed into a cylindrical shape, the first end edge 25 and the second end edge 26 may each have a length of about sixty (60) inches, and result in a wire cage 10 having a diameter of about eighteen (18) inches. It should be appreciated that the length of the first end edge 25 and the second end edge 26 may vary depending on the plant being surrounded. The first side edge 27 and the second side edge 28 may have any height required to cover a desired portion of the plant from animal interaction. The first side edge 27 and the second side edge 28 may have a length of about four feet, five feet, or six feet, for example, resulting in a same height to the wire mesh cage 10 when fully assembled.

As shown in FIG. 1, the first side edge 27 may be disposed adjacent the second side edge 28 when the wire mesh cage 10 is formed into a cylindrical shape. The first side edge 27 may be releasably coupled to the second side edge 28, for example, by a plurality of hooks 35 formed at the first side edge 27 of the wire mesh 20. The hooks 35 may be placed through one of the holes 24 formed in the wire mesh 20 adjacent the second side edge 28 thereof, to complete the cylindrical shape of the wire mesh cage 10. In other embodiments, the wire mesh 20 may not include the hooks 35 and the first side edge 27 may be releasably coupled to the second side edge 28 by any known means, including tying the side edges 27, 28 together or applying a fastener such as a C-ring (not shown) to the sides edges 27, 28. One of ordinary skill in the art may select other suitable means for coupling the side edges 27, 28, as desired.

The wire mesh cage 10 may further include means for securing the wire mesh cage 10 to the ground surface 70. For example, a plurality of sod pins 37, also known as sod staples, may be used to secure the wire mesh cage 10 to the ground surface 70. The sod pins 37 also stabilize the wire mesh cage 10 when secured to the ground surface 70.

In particular embodiments, each sod pin 37 is a substantially U-shaped rod having a pair of prongs that may be driven into the ground surface 70. Each of the sod pins 37 straddles the first end edge 25 of the wire mesh 20 through one of the holes 24 formed adjacent the ground surface 70. For example, as shown in FIG. 1, one of the sod pins 37 may be driven over the first end edge 25 of the wire mesh 20 where the first side edge 27 overlaps the second side edge 28, further coupling the first side edge 27 to the second side edge 28. FIG. 1 shows the wire mesh cage 10 as being secured by three of the sod pins 37, but any number of sod pins 37 may be used as desired.

The sod pins 37 of the present disclosure may be formed from 10 gauge steel, for example, but any suitable material may be used. The sod pins 37 may be any length necessary to secure the wire mesh cage 10 to the ground surface 70. The sod pins 37 may be ten to twelve inches long, for example. It should be understood that in place of the sod pins 37, the wire mesh cage 10 may be secured to the ground surface 70 by other suitable means such as ground anchors, stakes, or the like, as desired.

In most particular embodiments according to the present disclosure, the wire mesh cage 10 has a protective covering 12. Where the second end edge 26 is an uppermost surface of the wire mesh cage 10, the protective covering 12 is disposed over the second end edge 26 of the wire mesh cage 10.

In one embodiment shown in FIGS. 1 and 2, the protective covering 12 is a removable cap 16. The cap 16 may have a main body that is bulbous in shape, and have an annular channel 17 formed therein. For example, the annular channel 17 serves as an aperture configured to receive the second end edge 26 of the wire mesh 20 therein, in order to cover the entirety of the uppermost surface of the wire mesh cage 10. The cap 16 may further have an annular bulbous portion 18 formed on a side of the cap 16 opposite the annular channel 17 to provide addition cushion to the cap 16. It should be appreciated that the bulbous shape minimizes damage to a portion of the plant that strikes the bulbous cap during a storm or period of high winds.

In particular examples, the cap 16 may extend over the second end edge 26 by a distance necessary to protect a plant surrounded by the wire mesh cage 10 from damage due to contact of the plant with the wire mesh 20 forming the wire mesh cage 10. The cap 16 may extend over the second end edge 26 by a distance of about one to two inches (1-2"), for example. Other suitable heights for the cap 16 may be selected by a skilled artisan, as desired.

Alternatively, in place of the annular cap 16, the cap 16 may be provided as a linear piece of material having a channel formed along a length thereof. An example of the linear piece of material forming the cap 16 is shown in FIG. 1, where a broken line (A) indicates a division of the annular cap 16 into a linear piece of material having a first end formed to one side of the line (A) and a second end formed to the other side of the line (A). The first end and the second end of the linear cap 16 meet when the linear cap 16 is formed into a cylindrical shape by a user during an installation of the wire mesh cage 10. The linear cap 16 may be especially useful as it can be applied to the second end edge 26 when the wire mesh 20 is not formed into the cylindrical form shown in FIG. 1.

Although annular and linear caps 16 are described hereinabove, it should be understood that the cap 16 may be formed to have any shape necessary to cover the uppermost surface of the wire mesh cage 10, as desired.

The cap 16 may be formed from any material sufficient to militate against damage to a plant that may strike the cap 16, such as an end of the plant that is blown into the cap 16 by a gust of wind, for example. The cap 16 may be formed from a suitable polymer, including one of a resilient polyurethane foam and neoprene rubber, as nonlimiting examples. One of ordinary skill in the art may select suitable materials for the cap 16 within the scope of the present disclosure.

The material forming the cap 16 may also include at least one additive to prevent animals from eating or otherwise interfering with the cap 16. The additive may cause the cap 16 to have a spicy and hot taste or an extremely bitter taste. The additive may be formed from naturally occurring substances such as Louisiana hot sauce (such as Tabasco® sauce), cayenne pepper extract, or habanero pepper extract, as nonlimiting examples. Alternatively, the additive may be any odorous or poor tasting chemical compound known to repel animals, and capable of being combined with the primary material forming the cap 16, such as the polyurethane foam or the neoprene rubber. As a nonlimiting example, the additive may include Bitrex® denatonium compounds. Other types of additives sufficient to repel animals from the cap 16 may also be used, as desired.

It should also be understood that additives configured to militate against a weathering of the polymer may also be used, as desired. For example, the polymer may include ultraviolet inhibitors or antidegradants that minimize deterioration and damage of the polymer with exposure to solar UV radiation. Other types of anti-weathering additives may also be used within the scope of the present disclosure.

In another embodiment, the protective covering 12 is disposed on the second end edge 26 of the wire mesh 20 in the form of a coating of a protective material 13. For example, the protective material 13 may be applied or otherwise bonded to the wire mesh cage 10 in place of the cap 16. The protective material 13 may be a hot dipped vinyl polymer, a sprayed or brushed-on polymeric compound, or any other durable coating suitable for providing a softened surface, including any materials described as forming the cap 16.

Similar to the polymeric cap 16 described hereinabove, the protective material 13 may further include one of the additives described for militating against animal interference, and deterioration caused by weathering such as exposure to solar UV radiation.

Referring now to FIG. 7, the protective material 13 may be applied to the wire mesh cage 10 by dipping the wire mesh 20 into a tray 5 containing the protective material 13. The wire mesh 20 may be dipped to an extent providing a desired length of the wire mesh cage 10, as measured from the second end edge 26 toward the first end edge 25 in the protective material 13. For example, the wire mesh cage 10 may be dipped into the tray 5 to cover about two (2) inches of the wire mesh cage 10 in the protective material. Alternatively, the protective material 13 may be applied to the wire mesh cage 10 by spraying or brushing the protective material 13 on the wire mesh cage 10, as desired.

In operation, the wire mesh 20 is placed adjacent a plant in need of protection. The first end edge 25 of the wire mesh 20 may abut the ground surface 70, for example. The user then forms the wire mesh 20 into a cylindrical or tubular shape to surround the plant, by pulling the first side edge 27 toward the second side edge 28. The first side edge 27 may then be releasably coupled to the second side edge 28 by any known coupling means, including applying one of the hooks 35 formed on the first side edge 27 through a hole 24 formed in the wire mesh adjacent the second side edge 28.

Once formed around the plant, the wire mesh cage 10 may then be secured to the ground surface 70, and stabilized using at least one ground anchor such as the sod pins 37 described hereinabove. Where the protective covering 12 formed on the wire mesh cage is the coating of the protective material 13, it should be appreciated that no additional components need to be applied to the wire mesh cage 10. Where the protective covering 12 is the cap 16, then the user of the wire mesh cage 10 may apply the cap 16 over the second end edge 26, in order to cover the uppermost surface of the wire mesh cage 10 and militate against damage to any portion of the plant that may strike the protective covering 12.

It should be understood that the order of the steps provided hereinabove are not critical, and may be performed in any order, as desired. Where the plant has developed to the point where its foliage is no longer within reach of browsing animals, or where the plant has otherwise outgrown the protection of the wire mesh cage 10, the wire mesh cage 10 may be removed from the plant by detaching the first side edge 27 of the wire mesh 20 from the second side edge 28 thereof. A vertical opening in the wire mesh cage 10 is thereby created, allowing for easy removal of the wire mesh cage 10 from around the plant. Further removal of the wire mesh cage 10 may be performed by removing the plurality of sod pins 37, and lifting the wire mesh cage 10 up and over the plant, or by simply spreading the now open cage 10 apart and drawing the open cage 10 horizontally away from the plant.

Referring now to FIGS. 3-6, a wire mesh cage 10, 40 according to another embodiment of the disclosure is disclosed. In particular, the wire mesh cage 10, 40 is provided in the form of the stake cage 40. The stake cage 40 includes a plurality of posts or uprights 50, which are oriented vertically and arranged around a plant 3. For example, the stake cage 40 may include at least three of the uprights 50, which are substantially evenly spaced around a periphery of the plant 3.

FIG. 3 illustrates the uprights 50 as a plurality of T-shape posts 50a. The T-shaped posts 50a may have a substantially T-shaped cross-section. The T-shaped posts 50a may further include a plurality of spaced apart projections 52 formed along a length of the T-shaped posts 50a, on a back surface 54 thereof, giving the T-shaped posts 50a a cross-section having a substantially cross-like shape. The projections 52 may also have notches (not shown) or apertures (not shown) formed therein, in some embodiments.

FIG. 5 illustrates the upright 50 in the form of a U-shaped post 50b. A cross-section of the U-shaped post 50b may include a substantially U-shaped portion 57, and a pair of flanged portions 58 extending from each end of the U-shaped portion 57. The U-shaped post 50b may include a plurality of spaced apart apertures 59 formed along a length thereof.

Regardless of the cross-sectional shape, the uprights 50 of the present disclosure may be formed from any material having suitable strength to militate against an animal, such as an antlered animal, causing damage to the uprights 50 and the protected plant 3. The uprights 50 may be formed from steel, for example. Other suitable materials may also be used, as desired.

Each of the uprights 50 has a first end 55 and a second end 56. The first end 55 of each upright 50 may be driven into the ground surface 70, in order to maintain the uprights 50 in a vertical orientation around the plant 3. The second end 56 of each upright 50 is spaced apart from the ground surface 70 and represents an uppermost surface of the stake cage 40.

With renewed reference to FIG. 3, the stake cage 40 further includes at least one wire or filament 60 wrapped around the plurality of uprights 50. The at least one filament 60 forms the wire mesh 20 around the plant 3. The filament 60 shown in FIG. 3 originates from one of the uprights 50 adjacent the first end thereof 55, before being wound around the plurality of uprights 50 in an upward direction until the filament 60 terminates adjacent the second end 56 of the upright 50 from which it originated.

The filament 60 is further shown in FIG. 3 being wound around the uprights 50 with a spacing between adjacent portions of the filament 60 that spans three of the projections 52 formed on the T-shaped posts 50a serving as the uprights 50. It should be understood, however, that the filament 60 may be wound around the plurality of uprights 50 in any number of configurations, and with any desired spacing between adjacent turns of the filament 60. For instance, the filament 60 may be wound around the plurality of uprights 50 a second time to create a crisscrossing mesh or web of the filament 60. The filament 60 may be formed from any suitable material capable of preventing an animal from penetrating a mesh formed from the filament 60. Suitable materials for the filament 60 may be bailing twine or steel wire, as nonlimiting examples. Other types of materials and winding configurations for the at least one filament 60 may also be employed, as desired.

In particular embodiments shown in FIGS. 3-6, the second end 56 of each of the uprights 50 forming the stake cage 40 may further have the protective covering 12 disposed thereon. The protective covering 12 may be in the form of a plurality of stake caps 66 disposed over the second end 56 of each of the uprights 50. The stake caps 66 may be formed from the same material or materials described hereinabove in reference to the cap 16 and the protective material 13, as desired. The stake caps 66 may also be formed from a material having any of the additives described hereinabove.

Figure 4:
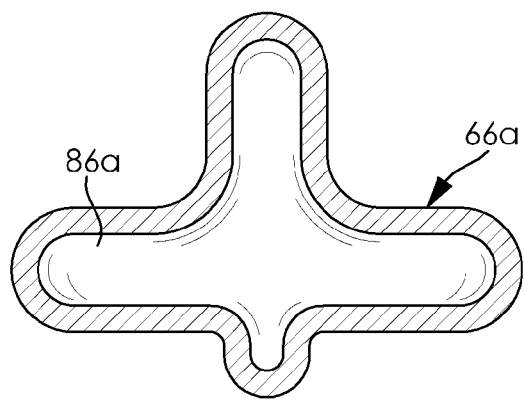
FIG. 4 is a cross-sectional bottom elevational view of one of the stake caps taken through line 4-4 in FIG. 3.

FIG. 4 illustrates a stake cap 66a for use with one of the T-shaped posts 50a. The stake cap 66a includes a main body having an aperture 86a formed in one end thereof. The aperture 86a may have a cross-sectional shape substantially corresponding to the cross-sectional shape of one of the T-shaped posts 50a, and which allows the aperture 86a to receive an end of one of the T-shaped posts 50a therein. The stake cap 66a is thereby removably coupled to one of the T-shaped posts 50a.

FIGS. 5 and 6 illustrate a stake cap 66b for use with one of the U-shaped posts 50b. The stake cap 66b includes a main body having an aperture 86b formed in one end thereof. The aperture 86b also has a cross-sectional shape substantially corresponding to the cross-sectional shape of one of the U-shaped posts 50b. The stake cap 66b thereby is able to receive an end of one of the U-shaped posts 50b therein, for coupling the stake cap 66b to one of the U-shaped posts 50b.

As also shown in FIG. 6, the stake cap 66b may have an aperture 86b having a cross-sectional shape including an arcuate portion surrounded by two substantially linear portions.

It should be understood that the stake caps 66 may be adapted for use with any form of upright 50, having any desired cross-sectional shape. The stake caps 66 are provided with apertures formed therein that substantially correspond to the cross-sectional shape of the upright 50 being covered by the stake cap 66.

Similar to the wire mesh cage 10 shown in FIG. 1, the second end 56 of each of the uprights 50 of the stake cage 40 may also be coated with the protective material 13 to form the protective covering 12. The protective material 13 may be any of the materials that were described as being bonded to the second end edge 26 of the wire mesh cage 10 hereinabove.

Referring again to FIG. 7, the second end 56 of each of the uprights 50 may be dipped into the tray 5 having the protective material 13 disposed therein to coat a desired length of the upright 50 in the protective material 13 in similar fashion to the wire mesh 20. Each of the uprights 50 may accordingly be dipped into the protective material 13 to coat about 2 inches of the second end 56 of each upright 50. Alternatively, the second end 56 of each upright 50 may be coated with the protective material 13 by means of brushing or spraying the protective material 13 thereon. In some embodiments, the filament 60 may also be selectively coated with the protective material 13, especially along portions of the filament 60 adjacent the second end 56 of each of the uprights 50.

In operation, the stake cage 40 shown in FIG. 3 is formed by first positioning the plurality of uprights 50 around the plant 3 in a desired arrangement. Next, the user drives the plurality of uprights 50 into the ground surface 70. The driving of the uprights 50 into the ground surface 70 may be performed using any known method, including using a steel post driving mechanism, for example.

Once the uprights 50 are secured to the ground surface 70, the filament 60 may next be wound around the plurality of uprights 50 to form the wire mesh 20. A first end of the filament 60 may be releasably coupled to one of the uprights 50 using any known method, including tying the filament 60 to the one of the uprights 50. In other embodiments, the uprights 50 may include a mechanism for securing the filament 60 to one of the uprights 50 or a separate fastening means may be applied to the uprights 50.

Where the filament 60 is wound around the uprights 50, the user may secure a position of the filament 60 to each upright 50 by utilizing one of the projections 52 formed on the back surface 54 of the T-post 50a, for example, or by utilizing one of the apertures 59 formed in the U-shaped portion of one of the U-shaped post 50b. In other embodiments, the uprights 50 may include additional features disposed thereon for positioning and retaining the filament 60 to each of the uprights 50.

Once the winding of the filament 60 is completed, a second end of the filament 60 may be secured to one of the uprights 50 using any known means, including tying the filament 60 to an upright 50, to form a completed mesh of the filament 60 around a periphery of the stake cage 40.

Once the basic structure of the stake cage 40 has been completed, the user may then add one of the stake caps 66 to the second end 56 of each of the uprights 50. If the uprights 50 are the T-shaped posts 50a, the stake cap 66a may be used. If the uprights 50 are the U-shaped posts 50b, the stake cap 66b may be used. If the protective covering 12 is in the form of an applied and bonded protective material 13 already present on the second end 56 of the uprights 50, no additional assembly of the stake cage 40 is required.

Advantageously, the stake caps 66a, 66b and the protective material 13 together aid in militating against damage to portions of the plant 3 when blown into or otherwise caused to strike a portion of the stake cage 40. Where the plant has developed to the point where its foliage is no longer within reach of browsing animals, or has otherwise outgrown the protection of the stake cage 40, the stake cage 40 may be removed by unfastening and unwinding the filament 60. Next, the user may remove the uprights 50 from the ground surface 70. Optionally, the user may also remove the stake caps 66, as desired.

In addition to surrounding a plant with the wire mesh cage 10, 40, the plant protection system may also include a method of protecting a plant from damage caused by smaller animals, such as mice, that may be able to pass through the wire mesh cage 10, 40. In such situations, one of the deterrent materials described as an additive hereinabove, such as a spicy substance or an excessively bitter substance, may be applied directly to a problem area identified on or around the plant, or any portion of the wire mesh cage 10, 40 in need of additional protection. The substance may, for example, be applied to a base of one of the cages 10, 40 or to a base of the plant being protected. The application of the substance may be performed by brushing or spraying the substance directly onto the problem area, thereby militating against small animals chewing or otherwise disturbing the areas to which the substance has been added.

The wire mesh cage 10, 40 of the present disclosure offer many advantages. The wire mesh cage 10, 40 is easy to construct and disassemble, while offering maximum protection from both browsing animals and antler rubbing. Furthermore, the use of the protective covering 12 in the form of the caps 16, 66a, 66b, or the coating of the protective material 13, further protects a young plant from damage caused by the plant repeatedly striking an otherwise hard surface of the wire mesh cage 10, 40, for example, when the plant is whipped back-and-forth by the wind into the cage 10, 40. Additionally, the use of a protective material 13 having an additive that prevents animals from disturbing the protective covering 12 minimizes maintenance of the wire mesh cage 10, 40, as opposed to known protective substances that require repeated applications due to the substance being washed away by the outdoor elements.

Further areas of applicability will become apparent from the description provided herein. It should be understood that the description and specific examples are intended for purposes of illustration only and are not intended to limit the scope of the present disclosure.

What is claimed is:

1. A plant protection device for deterring animal interaction with a plant, the device comprising:
   a cage having a first end edge and a spaced apart second end edge, the second end edge of the cage having an opening for the plant being surrounded to extend therethrough; and
   a protective covering disposed on the second end edge of the cage, the protective covering including a rubber cap, the rubber cap having a main body with a channel formed therein, wherein the main body is bulbous in shape and militates against damage to any portion of the plant that may strike the plant protection device, the rubber cap further having at least one additive to militate against animals eating or otherwise interfering with the rubber cap, wherein the additive is one of an odorous and poor tasting chemical compound known to repel animals,
   the protective covering militating against damage to the plant when the plant contacts the second end of the cage.

2. The plant protection device according to claim 1, wherein the protective covering is formed from one of a foam rubber and a neoprene rubber.

3. The plant protection device according to claim 1, wherein the protective covering includes an ultraviolet inhibitor.

4. The plant protection device according to claim 1, wherein the first end edge of the cage rests on a ground surface and the second end edge of the cage includes an opening for the plant being surrounded to extend therethrough.

5. The plant protection device according to claim 1, wherein the cage is formed from a sheet of wire mesh formed into a tubular shape to surround the plant.

6. The plant protection device according to claim 5, wherein the sheet of wire mesh includes a first side edge and a second side edge formed opposite thereto, wherein the first side edge is releasably coupled to the second side edge.

7. The plant protection device according to claim 6, wherein the releasable coupling of the first side edge to the second side edge is performed using a plurality of hooks extending from the first side edge.

8. A method for deterring animal interaction with a plant, the method comprising the steps of:
   providing a cage having a first end edge and a spaced apart second end edge, the second end edge of the cage having an opening for the plant being surrounded to extend therethrough;
   providing a protective covering including a rubber cap, the rubber cap having a main body with a channel formed therein, wherein the main body is bulbous in shape and militates against damage to any portion of the plant that may strike the protective covering, the rubber cap further having at least one additive to militate against animals eating or otherwise interfering with the rubber cap, wherein the additive is one of an odorous and poor tasting chemical compound known to repel animals;
   applying the protective covering to the second end of the cage, the second end edge of the cage received by the channel of the main body;
   placing the cage around the plant, the first end edge abutting a ground surface surrounding the plant and not extending into the ground surface; and
   securing the cage to the ground surface with at least one ground anchor, wherein the cage is stabilized in an upright position for deterring animal interaction with the plant.

9. The method according to claim 8, further comprising a step of driving a plurality of uprights around a periphery of the plant and winding at least one filament around the plurality of uprights to form a wire mesh surrounding the plant.

10. The method according to claim 8, wherein the step of providing the cage includes forming a sheet of wire mesh into a cylindrical shape around the plant and releasably coupling a first side edge of the sheet to a second side edge of the sheet to enclose the plant.

11. The method according to claim 8, further including a step of applying one of a spicy substance and a bitter substance directly to one of portions of the plant and an area adjacent the plant to militate against animal interaction with the plant.

* * * * *